United States Patent
Fuchs

(10) Patent No.: US 10,705,810 B2
(45) Date of Patent: Jul. 7, 2020

(54) AUTOMATIC CODE GENERATION

(71) Applicant: SAP SE, Walldorf (DE)

(72) Inventor: Matthias Fuchs, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/206,158

(22) Filed: Nov. 30, 2018

(65) Prior Publication Data

US 2020/0174760 A1 Jun. 4, 2020

(51) Int. Cl.
*G06F 8/36* (2018.01)
*G06F 11/36* (2006.01)
*G06F 8/70* (2018.01)

(52) U.S. Cl.
CPC .............. *G06F 8/36* (2013.01); *G06F 8/70* (2013.01); *G06F 11/3664* (2013.01); *G06F 11/3684* (2013.01); *G06F 11/3692* (2013.01)

(58) Field of Classification Search
CPC ..... G06F 8/30; G06F 8/36; G06F 8/40; G06F 8/51; G06F 8/52; G06F 8/70-72; G06F 8/74; G06F 11/364; G06F 11/3684; G06F 11/3692; G06F 11/3664
USPC ............... 717/106–108, 120, 124, 136, 137
See application file for complete search history.

(56) References Cited

U.S. PATENT DOCUMENTS

| | | | | |
|---|---|---|---|---|
| 6,925,638 B1 * | 8/2005 | Koved | ............... | G06F 9/4488 717/155 |
| 8,108,834 B2 * | 1/2012 | Oren | ............... | G06F 8/31 717/114 |
| 8,479,171 B2 * | 7/2013 | Ghosh | ............... | G06F 11/3684 717/124 |
| 9,471,304 B1 | 10/2016 | Fuchs | | |
| 9,626,164 B1 * | 4/2017 | Fuchs | ............... | G06F 8/36 |
| 2006/0150160 A1 * | 7/2006 | Taft | ............... | G06F 11/3604 717/126 |
| 2009/0007077 A1 * | 1/2009 | Musuvathi | ............... | G06F 11/3688 717/130 |
| 2010/0114939 A1 * | 5/2010 | Schulman | ............... | G06F 11/3672 707/769 |

(Continued)

OTHER PUBLICATIONS

Aiwu Shi and G. Naumovich, "Static analysis for computing escapability and mutability for Java components," Fifth IEEE International Workshop on Source Code Analysis and Manipulation (SCAM'05), Budapest, Hungary, 2005, pp. 119-128. (Year: 2005).*

(Continued)

*Primary Examiner* — Andrew M. Lyons
(74) *Attorney, Agent, or Firm* — Fish & Richardson P.C.

(57) ABSTRACT

The disclosure generally describes methods, software, and systems for generating code using test cases. A plurality of test cases is received for a new software component to be coded. Software components in a software component repository are identified, including determining software components having a similarity to the new software component to identify similar software components. For each of the similar software components, the received plurality of test cases is executed to generate results. The generated results are compared to expected outputs of the plurality of test cases to identify an existing software component adaptable to match the expected outputs. The new software component is created from the existing software component matching the expected outputs.

16 Claims, 3 Drawing Sheets

(56) References Cited

U.S. PATENT DOCUMENTS

| | | | | |
|---|---|---|---|---|
| 2011/0289488 | A1* | 11/2011 | Ghosh | G06F 11/3684 717/131 |
| 2014/0115565 | A1* | 4/2014 | Abraham | G06F 8/30 717/128 |
| 2014/0245259 | A1* | 8/2014 | Bolignano | G06F 11/3608 717/120 |
| 2017/0161035 | A1* | 6/2017 | Abadi | G06F 8/443 |
| 2018/0129597 | A1* | 5/2018 | Anaya | G06F 11/3692 |
| 2019/0079754 | A1* | 3/2019 | Makkar | G06F 8/73 |
| 2019/0114157 | A1* | 4/2019 | Makkar | G06F 8/72 |
| 2019/0325144 | A1* | 10/2019 | Doukhvalov | G06F 11/3664 |

OTHER PUBLICATIONS

U. Praphamontripong and G. Hu, "XML-based software component retrieval with partial and reference matching," Proceedings of the 2004 IEEE International Conference on Information Reuse and Integration, 2004. IRI 2004., Las Vegas, NV, 2004, pp. 127-132. (Year: 2004).*

I. Singh and A. Singh, "Gray testing support in software repository with keyword based extraction," 2014 International Conference on Advances in Computing, Communications and Informatics (ICACCI), New Delhi, 2014, pp. 1947-1952. (Year: 2014).*

P. Sagdeo, N. Ewalt, D. Pal and S. Vasudevan, "Using automatically generated invariants for regression testing and bug localization," 2013 28th IEEE/ACM International Conference on Automated Software Engineering (ASE), Silicon Valley, CA, 2013, pp. 634-639. (Year: 2013).*

Program Synthesis in 2017-18; Blog by Alex Plozov; dated Jul. 10, 2018; 11 pages; <https://alexpolozov.com/blog/program-synthesis-2018/>; [Retrieved from web Sep. 27, 2018].

Gulwani et al. "Program Synthesis", Foundations and Trends in Programming Languages; vol. 4, Issue 1-2, 2017, now Publishers Inc. Hanover, MA; 136 pages; <https://www.microsoft.com/en-us/research/wp-content/uploads/2017/10/program_synthesis_now.pdf>; [Retrieved from web Sep. 27, 2018].

Inala et al. "Synthesis of Recursive ADT Transformations from Reusable Templates"; dated Jul. 20, 2015; 17 pages; <https://engineering.purdue.edu/~xqiu/tacas2017.pdf>; [Retrieved from web Sep. 27, 2018].

Perelman et al. "Test-Driven Synthesis" PLDI '14, Jun. 9-11, 2014, Edinburgh, United Kingdon; 11 pages; <https://www.microsoft.com/en-us/research/publication/test-driven-synthesish; [Retrieved from web Sep. 27, 2018].

Srivastava et al. "Template-based Program Verification and Program Synthesis"; dated Oct. 1, 2013; 22 pages; <https:www.eecs.tufts.edu/~jfoster/papers/sttt-synthesis.pdf>; [Retrieved from web Sep. 27, 2018].

* cited by examiner

AUTOMATIC CODE GENERATION

BACKGROUND

The present disclosure relates to the automatic generation of code. In some conventional approaches, automatic code generation, such as program synthesis, can be completed using techniques that involve specifications and formal methods for producing code, including proof-to-code transformations. These conventional approaches typically do not scale very well and can require expert knowledge on the part of the user, often requiring a deep knowledge of formal languages for expressing specifications. Therefore, the conventional approaches are not widely adopted in developing software.

SUMMARY

This disclosure generally describes computer-implemented methods, software, and systems for automatically generating code using test cases. One computer-implemented method includes: receiving a plurality of test cases for a new software component to be coded; identifying software components in a software component repository, including determining software components having a similarity to the new software component to identify similar software components; for each of the similar software components, executing the received plurality of test cases to generate results, and comparing the generated results to expected outputs of the plurality of test cases to identify an existing software component adaptable to match the expected outputs; and creating the new software component from the existing software component matching the expected outputs.

The foregoing and other implementations can each optionally include one or more of the following features, alone or in combination. In particular, one implementation can include all the following features:

In a first aspect, combinable with any of the previous aspects, wherein determining the software components having a similarity to the new software component includes determining a sufficiently similar signature between the given software component and the new software component based on input parameters that are in agreement.

In a second aspect, combinable with any of the previous aspects, wherein determining the software components having a similarity to the new software component includes identifying a subset of the software components having input parameters matching input parameters of the new software component.

In a third aspect, combinable with any of the previous aspects, wherein each test case of the plurality of test cases includes an input-predicate pair including an input and a predicate testing the return value, or more generally the values of output variables, and/or the values of instance/class variables.

In a fourth aspect, combinable with any of the previous aspects, further comprising determining locations of return points in the software component for each of the predicates.

In a fifth aspect, combinable with any of the previous aspects, further comprising determining a context for the return point, wherein the context defines a set of possible values for each variable in a set of variables that are accessible at the return point in the software component.

In a sixth aspect, combinable with any of the previous aspects, wherein each variable is a typed or an un-typed variable.

In a seventh aspect, combinable with any of the previous aspects, wherein the software component is a function, a method, or a program.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for generating new software components from existing software components that are similar. For example, the generation of a new software components can follow a copy, paste, and adapt sequence of code synthesis through reuse and adaptation of existing code.

Techniques described in the present disclosure can be based on the use of test cases designed for the new function to be created. The test cases can provide samples of the input/output behavior of the new function. Existing software components in a repository can be examined and selected based on how well their input signature (e.g., list of parameters) matches the input signature of the desired code (based on the test cases). Analysis and modification of such candidates can lead to code that satisfies the test cases if the available code is sufficiently close to the required code. More precisely, control point-related statements (such as return statements) can be modified by utilizing state information (e.g., of local variables) of the function at the time that the respective control point-related statement is executed. In some implementations, techniques of the well-known principle of Test-Driven Development (TDD) can serve as a framework to provide test cases and evaluate the code being tested. The manual coding step of TDD can be replaced or enhanced with the automated code adaptation approach.

Creating new code by selecting, analyzing, and modifying existing code in the context of test cases (or TDD) does not require any specialized knowledge on the part of the user. This is a clear advantage over more conventional approaches to program synthesis. Furthermore, the simplicity of the approach does not cause any performance or scaling issues that are typically experienced in the context of formal methods (such as automated theorem proving) applied to the task of program synthesis. Obviously, this simple approach is limited by the available code and the type of statements and the way the code can be modified or adapted. Nonetheless, in particular in the context of TDD, this approach can simplify or eliminate recurring programming tasks, allowing a programmer to focus on more challenging tasks.

Figure 1:
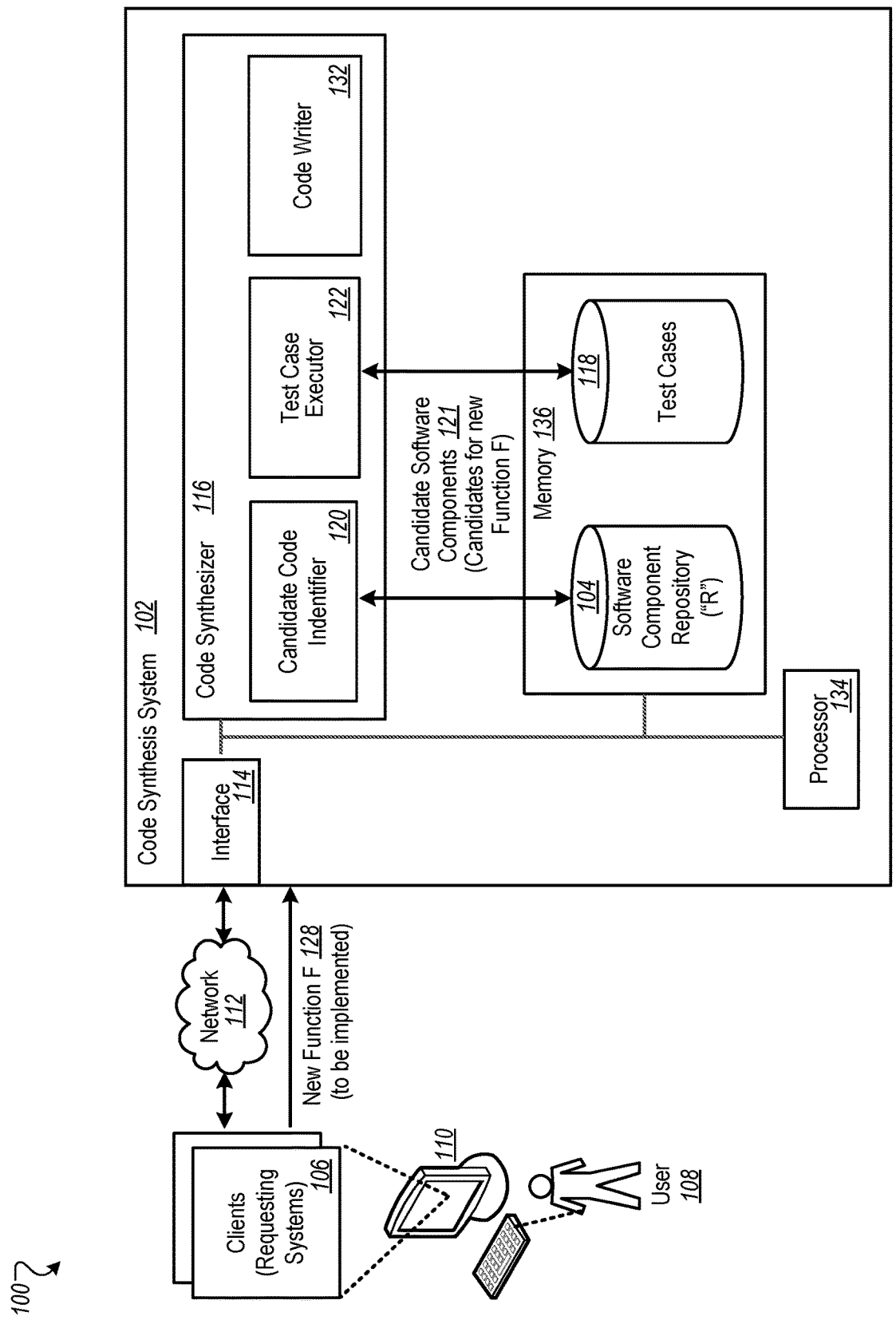
FIG. 1 is a block diagram of an example environment for synthesizing new code using existing software components.

FIG. 1 is a block diagram of an example environment 100 for synthesizing new code using existing software components. The environment 100 includes a code synthesis system 102 that can generate code, for example, for a new function using an existing software component having inputs, outputs, and behavior matching requirements of the new function. Existing software components that are candidates for use can be identified from a software component repository 104 that includes software components such as code fragments or units, each performing a specific task. For example, a code unit can be a function, a method, a program, or some other piece of computer code that performs a task. The task that is performed can be, for example, a task to produce a return or output value based on one or more received input parameters. Generation of the new function can be initiated, for example, when a request to generate the new function is received from a client 106 (e.g., a requesting system). The request can be initiated, for example, by a user 108 using a graphical user interface (GUI) 110 during code development. The request can be a request to generate a new function based on a set of test cases describing how the new function should operate. In another example, a set of test cases (one for each new function to be generated) can be provided by the client 106, such as to perform a background task of generating multiple new functions. Requests can be sent, for example, through a network 112 (for example, including the Internet and other networks) and received by an interface 114 of the code synthesis system 102.

The code synthesis system 102 includes a code synthesizer 116 that can create the computer code for the new function. The code synthesizer 116 can include a candidate code identifier 120 that identifies candidate software components 121 from the software component repository 104 that match requirements of the function to be coded. Identification of candidate software components 121 can begin, for example, by examining test cases 118 of the new function to be implemented. In some implementations, the test cases of the new function to be implemented can be included in the request that is received from the client 106. When the test cases 118 are already stored at the code synthesis system 102, for example, the request received from the client 106 can identify the new function to be implemented, such as including the name of the new function. This can allow the code synthesizer 116 to match the requested new function, by function name, to existing test cases 118 for the new function. In some implementations, the test cases can be provided by the user 108 who specifies, for each test case, one or more input variables and the desired output. The format of the test cases can be standardized for streamlined use by the code synthesis system 102.

A test case executor 122, for example, can execute the test cases 118 for the new function against candidate functions that are identified from the software component repository 104. For example, running the test cases against a given existing software component can end if a specific desired result is not achieved. If the test cases succeed in showing that the existing software component has a sufficiently similar signature to Function F, then the existing software component can be designated for use to generate the code for the new function. For example, test case results do not have to match exactly. If an exact match occurs, then the candidate is the function being looked for and does not require adaptation. A candidate merely needs to have a "sufficiently similar" signature. None of the test cases need to succeed. Further, the return type of the candidate can be different from the return type of the function.

In an example, consider a new software component (e.g., new Function F 128) that is not yet a part of the software component repository 104 (e.g., R), because Function F has not yet been implemented and no code exists. However, test cases 118 for Function F exist, and the test cases define a desired input/output behavior of Function F for each of the test cases.

Each of the test cases for the new Function F can be, for example, a test case T of the form T=(I,P), where I is the input of Function F (including possible values for all input parameters), and where P is a predicate P(y). The predicate can be a unary predicate, meaning that there is a unique output value y for each input I. The test cases for the new Function F serve to define or represent the behavior of an existing software component that might be used to implement the new Function F. As such, the test cases for the new Function F can represent a behavioral model of the existing software component. There may be one or more existing software components that have a sufficiently similar signature to Function F, or there may be none.

The input and output parameters for the new Function F can be used to identify every existing software component G in the software component repository R that has a sufficiently similar signature to Function F. For example, the sufficiently similar signature can include or represent a set of largely-agreeing input parameters between the new Function F and the existing software component G. The parameters for a candidate for the new Function F can ideally be the same parameters in the same order, or may be in a different order, as long as modifications to the existing software component G can be made to transform the code into the new Function F (to implement the Function F).

For each existing software component G that may be a candidate for the new Function F, the test case executor 122 can identify and collect return points r of the existing software component G that include the locations in the code where a value is returned. For each return point r, the test case executor 122 can also collect the accessible or visible local variables, defining the scope, or S(r), at the given return point r.

For each test case T=(I,P), the existing software component G can be executed by the test case executor 122 to apply the input values I of T. During each execution by the test case executor 122, the existing software component G will exit through one of its return points. The specific return point can provide values of all variables in the scope available at the respective return point. If there are situations where the behavior of the existing software component G cannot be reconciled with the desired behavior (such as raising an exception when an output value is required), the existing software component G can be removed from the list of candidates. If the removal of all candidates of existing software components G occurs, then the approach of the code synthesis system 102 will fail. This can mean that the new Function F will need to be written from scratch and not based on an existing software component G in the software component repository R. In some implementations, a best-matching candidate G can be used for parts of the new Function F, such as if the existing software component G is not a perfect or good enough match. In this case, information can be provided by the code synthesis system 102 that identifies the ways in which the existing software component G is deficient.

For each return point r of G, a term t is required that, when evaluated and returned, satisfies the predicates of all test cases that exit G through r. The term t can be constructed using the local variables of S(r). For example, the code synthesis system 102 can search for a function F that takes an array of integers a and an integer v and returns the index (or location) of v in a. In this example, if v is in a, then the function F returns an integer that is the index of v in a.

However, if v is not in a, then the function F returns −1. Assume that R includes (among others) the following G that checks whether v is in a:

```
bool G(int[ ] a, int v)
{
    if (a == null)
        return false;
    for (int i = 0; i < a.length; i++)
    {
        if (a[i] == v)
            return true;
    }
    return false;
}
```

That means that three return points r1, r2, and r3 are defined, serving to categorize the types of inputs and outputs of G:

```
bool G(int[ ] a, int v)
{
    if (a == null)
        return false; // r1
    for (int i = 0; i < a.length; i++)
    {
        if (a[i] == v)
            return true; // r2
    }
    return false; // r3
}
```

The return points r1, r2, and r3 have the following scopes: $S(r1)=\{\ \}$ (empty set), $S(r2)=\{i\}$, and $S(r3)=\{\ \}$.

The parameters of the function (in this case a and v) are also visible. This means that the three scopes can include a and v (even though they do not play a role here, but they could in other situations). Hence, the scopes can also be written as $S(r1)=\{a,v\}$, $S(r2)=\{a, v,i\}$, and $S(r3)=\{a, v\}$. However, for the sake of notational simplicity, a and v are omitted.

The following example test cases can exist, with y representing the output value:

$T1=(<a=\text{null}, v=42>, y==-1)$//this is a null array $T2=(<a=[\ ], v=4711>, y==-1)$//this is an empty array $T3=(<a=[1,2,3], v=4>, y==-1)$//and the remaining lines are three-element arrays $T4=(<a=[1,2,3], v=1>, y==0)$ $T5=(<a=[1,2,3], v=2>, y==1)$ $T6=(<a=[1,2,3], v=3>, y==2)$ For the code synthesis system 102 to operate correctly, the test cases must be in a standardized format, including identifying variable types when applicable (e.g., (integer, integer array) in the current example). In the test cases T1-T6, the symbol "=" is used to denote assignment, and the symbol "==" is used to denote equality comparison. T1 exits through return point r1; T2 and T3 exit through return point r3; and T4, T5, and T6 exit through return point r2. Let t1, t2, and t3 be the return terms for r1, r2, and r3, respectively.

These terms have yet to be defined, so initially t1, t2, and t3 can be placeholders. Hence, G can be rewritten at this time as:

```
bool G(int[ ] a, int v)
{
    if (a == null)
        return t1; // r1
    for (int i = 0; i < a.length; i++)
    {
        if (a[i] == v)
            return t2; // r2
    }
    return t3; // r3
}
```

Only r2 has a non-empty scope $S(r2)=\{i\}$ meaning that an integer value is returned, as the element exists in the array. Test cases T4 through T6 can provide the values of the variables in the scope (e.g., indicating which variables are available), resulting in what can be referred to as evaluation contexts:

$C4=\{i:0\}$ $C5=\{i:1\}$ $C6=\{i:2\}$

Contexts C1, C2, and C3 are empty, meaning that $C1=C2=C3=\{\ \}$(the empty set). Note that each test case is associated with its respective context, in this example T1 through T6, with C1 through C6, respectively. Let t|C be the value of term t in the context C, for example, with $i|C5=1$. Note that any constant evaluates to its own value regardless of context, for example, $42|\{\ \}=42$.

Note also that any non-constant term that consists (in parts) of variables that do not occur in the context will have an undefined value, since those variables are of no use or interest to the user. Based on the given test cases, the return points can be associated with predicates as follows (using * to signify a logical conjunction (or AND) since the predicates of all test cases have to be satisfied):

$r1=>t1|C1==-1$, which is equivalent to $t1|\{\ \}==-1$ $r2=>t2|C4==0*t2|C5==1*t2|C6==2$ $r3=>t3|C2==-1*t3|C3==-1$, which is equivalent to $t3|\{\ \}==-1$ In general, each return point r is associated with a predicate that is a conjunction of the predicates from the test cases that return through r, where y is replaced with t|C, where t is the place holder term for r, and C is the context of the respective test case. Here, t1 and t3 have no scope, i.e., there are no variables they can use, so they must be constants. An obvious constant that satisfies the predicates is −1, so both t1 and t3 are −1. A constant does not work for t2, but scope variable i does. Hence t2=i. This provides the desired F:

```
int F(int[ ] a, int v)
{
    if (a == null)
        return -1;<-- returns term based on machine
learning
    for (int i = 0; i < a.length; i++)
    {
        if (a[i] == v)
            return i;
```

-continued

```
    }
    return -1;
}
```

The task of creating a t value for each return point r can be automated using a variety of known machine-learning algorithms beyond the simplistic (yet in some cases successful) approach to select one of the scope variables, or a constant that is a part of the predicate. Note that it is also possible to extend the approach to (static and instance) methods by including static (and instance) properties of the respective class into the scope. Return values can also be instance variables or class variables.

Assignments to instance or class variables can also be treated similar to return points. That is, instead of "return t", one can consider "x=t", where x is an instance or class variable. That means that the definition of the predicate needs to be extended to include a reference to the current instance O being tested, e.g., P(y, O). Special cases are P(y) if there is no instance, or P(O) if there is no return value (or void).

In some implementations, the following pseudo-code can be used to identify candidates of existing software components to use in generating a new function:

```
// Given: test cases T1, . . . ,Tm where Ti=(TYPE1 p1, . . . ,TYPEn pn;P(y)); the types TYPEi are the same for all test cases; P is a predicate testing output y
// Given: a repository R containing functions (or methods)
01 select first/next G from R
02 if there are no more Gs then EXIT with FAILURE
03 if G's parameters do not match TYPE1, . . . ,TYPEn (even after changing the order) then goto 01
   //On top of changing the order, it is also possible to drop certain parameters (if G has more parameters than are needed) and use default values for those parameters.
04 locate all return statements of G, labelling them r1, . . . ,rk
05 for each ri determine the scope S(ri) containing all local (instance) variables available when executing return statement ri
06 replace every return statement of G with <r, C> where r is the respective ri and C is the context that associates the value of each x in S(r) with x
07 select first/next test case T from T1, . . . ,Tm
08 if there are no more test cases then goto 13
09 run modified G for input p1 , . . . pn of T resulting in <r, C>
10 add output test P as per T to <r, C>, giving <r, C.P>
11 store <r, C.P> in result list RL
12 goto 07
13 group the elements of RL by r, thus associating a list of C.P with each return location ri
14 let F be a copy of G
15 select first/next return location r from r1, . . . ,rk
16 if there are no more return locations then EXIT with SUCCESS: F is the function that satisfies the test cases
17 let C1.P1, . . . be the context/output associated with r (as per grouping on line 13)
18 find a term s using variables in C1, . . . so that for all Ci evaluation of s in the context of Ci satisfies Pi
19 if no such s can be found goto 01
20 in F the return statement at return location r is set to s goto 15
// Note: steps 04 and 05 require parsing of G
// Note that step 18 can be implemented using various methods, including full-blown machine learning approaches.
// Recall that a context C maps variables (names) to values;
   evaluation of a term s in the context of C means replacing a variable in s with the respective value as per context C. By design, s contains only variables from C and constants, and possibly built-in operators like + or -, depending on the type of the return value
// A very simple and rather limited way to produce s would be:
18.1 if all Pi test equality w.r.t. the same value v, then let s be v; goto 20
18.2 if there is a variable x in Ci so that Pi(x) is satisfied then let s be x; goto 20
```

A code writer 132 can generate the entire new function F using a selected one of the candidate software components G. The interface 114, in addition to handling requests received from the clients 106, can serve as the interface for providing information in response to the requests. For example, after the code synthesis system 102 (and particularly, the code writer 132) has generated the new Function F, the interface 114 can be used to provide the new Function F to the client 106, such as for display in the GUI 110.

Memory 136 includes the software component repository 104, the test cases 118, and any other information that the code synthesis system 102 needs to perform its operations. At least one processor 134 can perform the processing functions of the code synthesis system 102. For example, the at least one processor 134 can execute instructions of the interface 114 and the code synthesizer 116 (including its components).

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
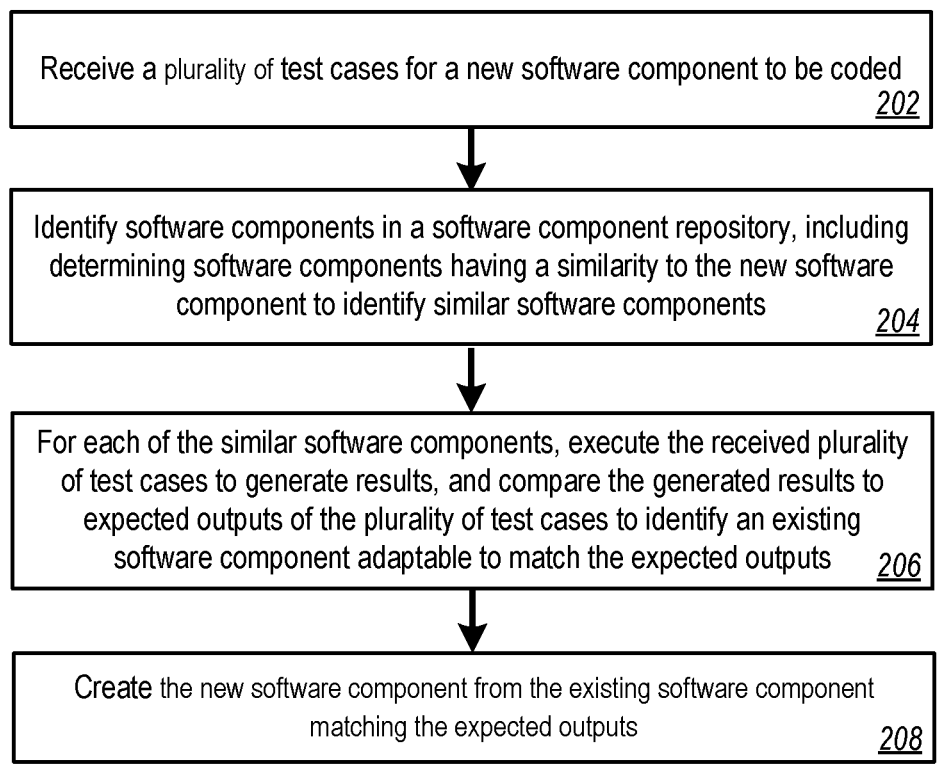
FIG. 2 is a flowchart of an example method for generating code for a new function.

FIG. 2 is a flowchart of an example method 200 for generating code for a new function. Method 200 can be performed by the system 100, for example. For clarity of presentation, the description that follows generally describes method 200 in the context of FIG. 1.

At 202, a plurality of test cases for a new software component (e.g., new function F) to be coded are received. The software component can be, for example, a function, a method, or a program. The test cases 118 may already exist at the code synthesis system 102, or the test cases can accompany a request received by the code synthesis system 102 to generate the new function F. From 202, method 200 proceeds to 204.

At 204, software components (e.g., G) in a software component repository are identified, including determining software components having a similarity to the new software component (e.g., new function F) to identify similar software components. For example, the candidate code identifier 120 can identify existing software components G that have similar input and output parameters to those of new function F.

In some implementations, determining software components having a similarity to the new software component includes determining a sufficiently similar signature between the given software component and the new software component (e.g., new function F) based on input parameters that are in agreement. For example, the candidate code identifier 120 can determine if the input/output signature of a given software component G and the new function F have a predetermined degree of similarity.

In some implementations, determining software components having a similarity to the new software component includes identifying a subset of the software components that have input parameters matching input parameters of the new software component. In some implementations, each test case T can include an input-predicate (I, P) pair, including an input I and a predicate P(y) for an output value y. The output value y can be a single output/return value or a list of output values. As previously described, assignments to instance or class variables can also be treated similar to return points. That is, instead of "return t", one can consider "x=t", where x is an instance or class variable. That means that the definition of the predicate needs to be extended to include a reference to the current instance O being tested, e.g., P(y, O). Special cases are P(y) if there is no instance, or P(O) if there is no return value (or void). From 204, method 200 proceeds to 206.

At 206, for each of the similar software components, the received plurality of test cases is used to identify an existing software component that has a sufficiently similar signature to Function F. For example, the plurality of test cases for the new software component (e.g., new function F) are compared with the input parameters of the software components. The signature match is used to identify candidates for the adaptation process. Once the adaptation process succeeds, additional software components can optionally be considered. For example, the method can continue looking for additional alternatives, even though one successful adaptation has been produced. Then, the user can decide which one is best if multiple successful adaptations exist. Executing the test cases includes identifying a subset of software components G having return points that meet requirements of the test cases for the new function F. Executing the test cases can also include identifying a return point r that exists in the software component G for each of the predicates P(y). Each return point can return a different value (or a different category of values) of the function, for example. Executing the test cases can also include determining a context C for the return point r, wherein the context C defines a set of possible values for each variable in a set of variables that are accessible at the return point r in the software component G. Each variable can be a typed variable or an un-typed variable. Typed variables can include (but are not limited to) a null value, an integer, a non-integer, a character string, a Boolean value, or an enumeration type. From 206, method 200 proceeds to 208.

At 208, the new software component is created from the existing software component matching the expected outputs. For example, the new software component is created based on results of executing the plurality of test cases for the new software component (e.g., new function F) against the software components G. For example, the code writer 132 can complete the generation of the new function F. After 208, method 200 stops.

Figure 3:
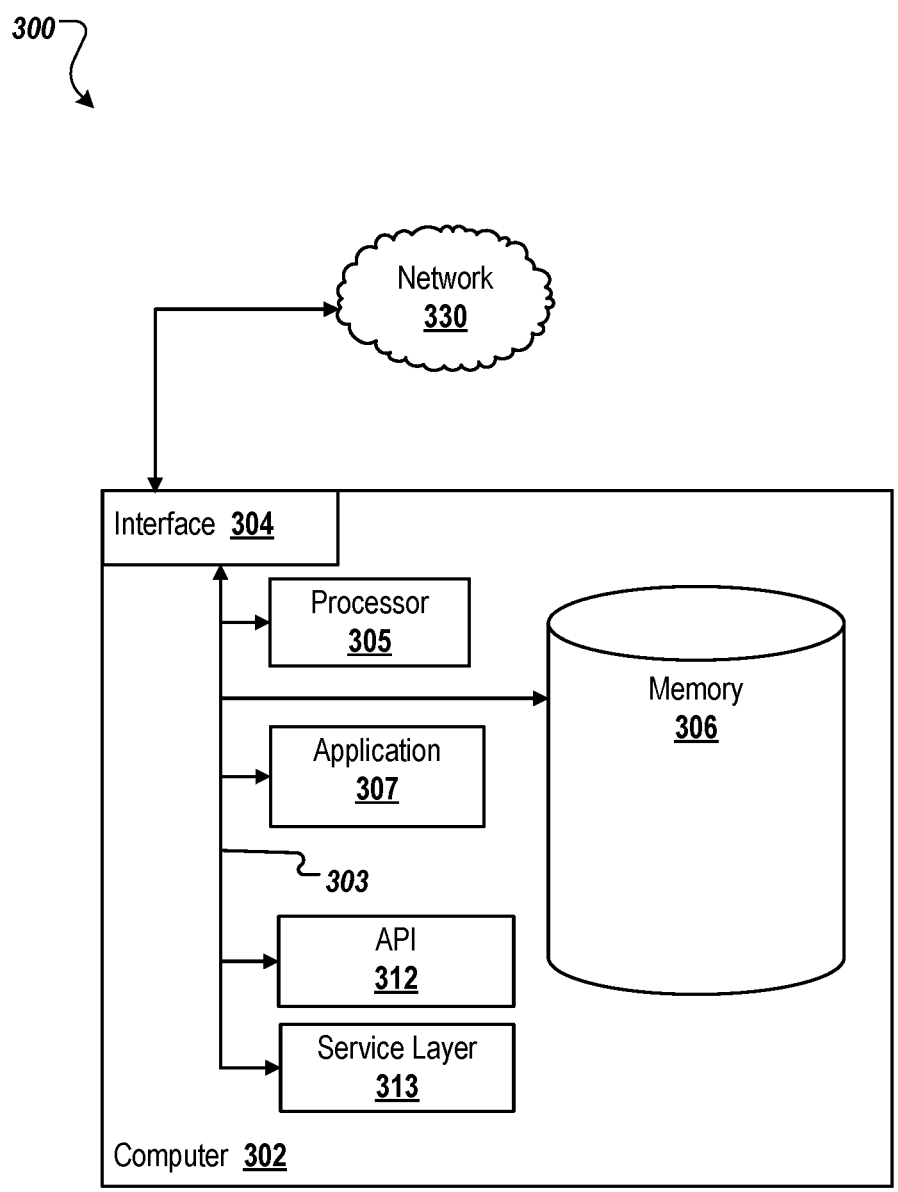
FIG. 3 is a block diagram of an exemplary computer system used to provide computational functionalities associated with described algorithms, methods, functions, processes, flows, and procedures as described in the instant disclosure.

FIG. 3 is a block diagram of an exemplary computer system 300 used to provide computational functionalities associated with described algorithms, methods, functions, processes, flows, and procedures as described in the instant disclosure.

The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a graphical user interface (GUI).

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, business intelligence (BI) server, or other server (or a combination of servers).

The computer 302 can receive requests over a network 330 from a client application (for example, executing on another computer 302), and respond to the received requests by processing those requests in an appropriate software application. In addition, requests may also be sent to the computer 302 from internal users (for example, from a command console or by any other appropriate access method), external users, third-parties, other automated applications, or any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application program interface (API) 312 or a service layer 313 (or a combination of an API 312 and a service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether illustrated or not) that are communicably coupled to the computer 302. The functionality of the computer 302 may be accessible for all service consumers using this service layer. Software services, such as those provided by the service layer 313, provide reusable, defined business functionalities through a defined interface. For example, the interface may consist of software written in JAVA, C++, or other suitable language, providing data in extensible markup language (XML) format or another suitable format. While illustrated as an integrated component of the computer 302, alternative implementations may illustrate the API 312 or the service layer 313 as stand-alone components in relation to other components of the computer 302 or other components (whether illustrated or not) that are communicably coupled to the computer 302. Moreover, any or all parts of the API 312 or the service layer 313 may be implemented as children or sub-modules of another software module, enterprise application, or hardware module without departing from the scope of the instant disclosure.

The computer 302 includes an interface 304. Although illustrated as a single interface 304 in FIG. 3, two or more interfaces 304 may be used according to particular needs, desires, or implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals inside or outside of the illustrated computer 302.

The computer 302 includes a processor 305. Although illustrated as a single processor 305 in FIG. 3, two or more processors may be used according to particular needs, desires, or implementations of the computer 302. Generally, the processor 305 executes instructions and manipulates data to perform the operations of the computer 302 using algorithms, methods, functions, processes, flows, and procedures such as those described in the instant disclosure.

The computer 302 also includes a memory 306 that holds data for the computer 302 or other components (or a combination of both) that can be connected to the network 330 (whether illustrated or not). For example, memory 306 can be a database storing data consistent with this disclosure. Although illustrated as a single memory 306 in FIG. 3, two or more memories may be used according to particular needs, desires, or implementations of the computer 302 and the described functionality. While memory 306 is illustrated as an internal component of the computer 302, in alternative implementations, memory 306 can be external to the computer 302.

The application 307 is an algorithmic software engine providing functionality according to particular needs, desires, or implementations of the computer 302, particularly with respect to the functionality described in this disclosure. For example, application 307 can serve as one or more components, modules, applications, etc. Further, although illustrated as a single application 307, the application 307 may be implemented as multiple applications 307 on the computer 302. In addition, although illustrated as internal to the computer 302, in alternative implementations, the application 307 can be external to the computer 302.

There may be any number of computers 302 associated with a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

In some implementations, components of the environments and systems described above may be any computer or processing device such as, for example, a blade server, a general-purpose personal computer (PC), a Macintosh workstation, a UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described herein may be a central processing unit (CPU), an application specific integrated circuit (ASIC), a field-programmable gate array (FPGA), or another suitable component. Generally, each processor can execute instructions and manipulate data to perform the operations of various components. Specifically, each processor can execute the functionality required to send requests and/or data to components of the environment and to receive data from the components of the environment, such as in communication between the external, intermediary and target devices.

Components, environments, and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary, and external devices. Other components within the memory are possible.

Regardless of the particular implementation, "software" may include computer-readable instructions, firmware, wired and/or programmed hardware, or any combination thereof on a tangible medium (transitory or non-transitory, as appropriate), operable when executed to perform at least the processes and operations described herein. Each software component may be fully or partially written or described in any appropriate computer language including C, C++, Java™, Visual Basic, assembler, Perl®, any suitable version of 4GL, or any other suitable computer language. Software may include a number of sub-modules, third-party services, components, libraries, etc., as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a GUI. The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

The invention claimed is:

1. A computer-implemented method comprising:
   receiving a plurality of test cases for a new software component to be coded;
   identifying software components in a software component repository, including determining software components having a similarity to the new software component to identify similar software components;
   for each of the similar software components, executing the received plurality of test cases to generate results, and comparing the generated results to expected outputs of the plurality of test cases to identify an existing software component adaptable to match the expected outputs; and
   creating the new software component from the existing software component matching the expected outputs, wherein creating the new software component includes:
      identifying return points in the existing software component, wherein the identified return points include a first return point that is included in a first scope that includes at least one local variable and a second return point that is included in a second scope that does not include any local variables; and
      replacing, for each identified return point, a return value for the return point, including;
         replacing a first return value for the first return point with a local variable included in the first scope based on the first return point being included in the first scope that includes at least one local variable; and
         replacing a second return value for the second return point with a first constant value determined based on an output value of a first test case, based on the second return point being included in the second scope that does not include any local variables.

2. The computer-implemented method of claim 1, wherein determining the software components having a similarity to the new software component includes determining a sufficiently similar signature between the given software component and the new software component based on input parameters that are in agreement.

3. The computer-implemented method of claim 1, wherein determining the software components having a similarity to the new software component includes identifying a subset of the software components having input parameters matching input parameters of the new software component.

4. The computer-implemented method of claim 3, wherein each test case of the plurality of test cases includes an input-predicate pair including an input and, for an output variable, either one of a predicate or an assignment to instance/class variables.

5. The computer-implemented method of claim 1, wherein each variable is a typed or an un-typed variable.

6. The computer-implemented method of claim 1, wherein the software component is a function, a method, or a program.

7. A system comprising:
   memory storing:
      a repository of a plurality of test cases; and
      a repository of software components; and
   a server performing operations comprising:
      receiving the plurality of test cases for a new software component to be coded;
      identifying software components in the software component repository, including determining software components having a similarity to the new software component to identify similar software components;
      for each of the similar software components, executing the received plurality of test cases to generate results, and comparing the generated results to expected outputs of the plurality of test cases to identify an existing software component adaptable to match the expected outputs; and
      creating the new software component from the existing software component matching the expected outputs, wherein creating the new software component includes:
         identifying return points in the existing software component, wherein the identified return points include a first return point that is included in a first scope that includes at least one local variable and a second return point that is included in a second scope that does not include any local variables; and
         replacing, for each identified return point, a return value for the return point, including;
            replacing a first return value for the first return point with a local variable included in the first scope based on the first return point being included in the first scope that includes at least one local variable; and
            replacing a second return value for the second return point with a first constant value determined based on an output value of a first test case, based on the second return point being included in the second scope that does not include any local variables.

8. The system of claim 7, wherein determining the software components having a similarity to the new software component includes determining a sufficiently similar signature between the given software component and the new software component based on input parameters that are in agreement.

9. The system of claim 7, wherein determining the software components having a similarity to the new software component includes identifying a subset of the software components having input parameters matching input parameters of the new software component.

10. The system of claim 9, wherein each test case of the plurality of test cases includes an input-predicate pair including an input and, for an output variable, either one of a predicate or an assignment to instance/class variables.

11. The computer-implemented method of claim 7, wherein each variable is a typed or an un-typed variable.

12. The system of claim 7, wherein the software component is a function, a method, or a program.

13. A non-transitory computer-readable media encoded with a computer program, the program comprising instructions that when executed by one or more computers cause the one or more computers to perform operations comprising:

receiving a plurality of test cases for a new software component to be coded;

identifying software components in a software component repository, including determining software components having a similarity to the new software component to identify similar software components;

for each of the similar software components, executing the received plurality of test cases to generate results, and comparing the generated results to expected outputs of the plurality of test cases to identify an existing software component adaptable to match the expected outputs; and creating the new software component from the existing software component matching the expected outputs, wherein creating the new software component includes:

identifying return points in the existing software component, wherein the identified return points include a first return point that is included in a first scope that includes at least one local variable and a second return point that is included in a second scope that does not include any local variables; and replacing, for each identified return point, a return value for the return point, including;

replacing a first return value for the first return point with a local variable included in the first scope based on the first return point being included in the first scope that includes at least one local variable; and replacing a second return value for the second return point with a first constant value determined based on an output value of a first test case, based on the second return point being included in the second scope that does not include any local variables.

14. The non-transitory computer-readable media of claim 13, wherein determining the software components having a similarity to the new software component includes determining a sufficiently similar signature between the given software component and the new software component based on input parameters that are in agreement.

15. The non-transitory computer-readable media of claim 13, wherein determining the software components having a similarity to the new software component includes identifying a subset of the software components having input parameters matching input parameters of the new software component.

16. The non-transitory computer-readable media of claim 15, wherein each test case of the plurality of test cases includes an input-predicate pair including an input and, for an output variable, either one of a predicate or an assignment to instance/class variables.

* * * * *